UNITED STATES PATENT OFFICE.

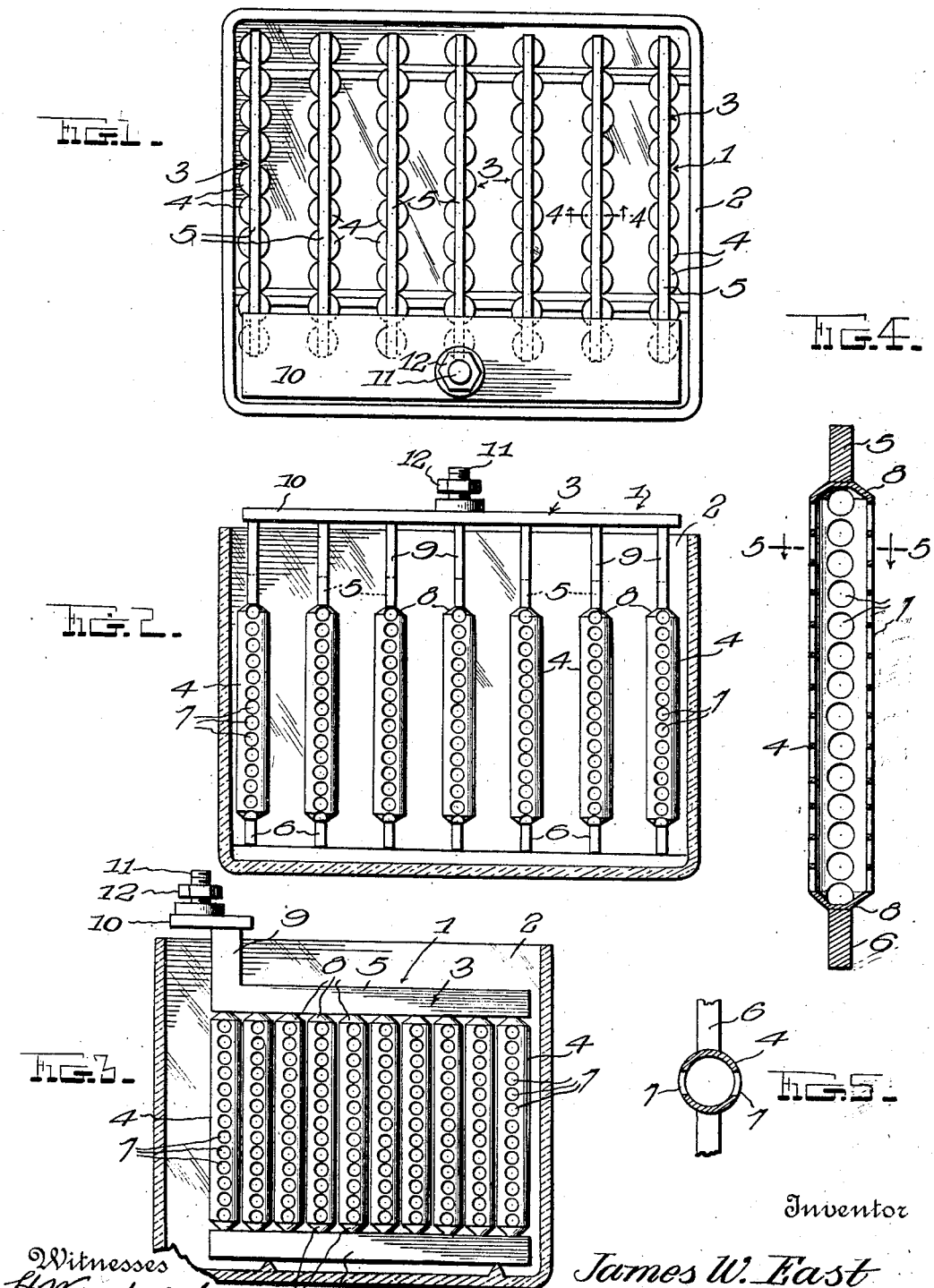

JAMES WILLIAM EAST, OF TEAGUE, TEXAS.

STORAGE BATTERY.

1,172,586.        Specification of Letters Patent.        Patented Feb. 22, 1916.

Application filed September 13, 1915. Serial No. 50,447.

*To all whom it may concern:*

Be it known that I, JAMES W. EAST, a citizen of the United States, residing at Teague, in the county of Freestone and State of Texas, have invented certain new and useful Improvements in Storage Batteries; and I do declare the following to be a full, clear, and exact description of the invention, such as will enable others skilled in the art to which it appertains to make and use the same.

This invention relates broadly to electric batteries, particularly secondary or storage batteries, and has for one object to provide a device of this character to improve construction whereby the accumulative efficiency is greatly increased.

A further object of my invention is to provide a storage battery having grids in which the active material may be securely held and yet which will be of sufficient porosity to cause the cell to be of large capacity.

With the above and minor objects in view, my invention relates to certain novel features of construction, combination and arrangement of parts which will be hereinafter more particularly described and claimed.

Both of the electrodes of this storage battery are constructed in substantially the same manner with the exception that the active materials contained in the grids are of different substances as is usually the case in this type of battery.

As my invention relates to the construction of the grids and not the contents thereof I have shown only the negative electrode in the drawing.

In this drawing: Figure 1 represents a top plan view of a negative electrode embodying my features of construction and disposed within a vat or containing vessel; Fig. 2 is a side elevation of one of the grids; Fig. 3 is an edge view of the plurality of girds composing this electrode; Fig. 4 is a detail vertical section taken on the line 4—4 of Fig. 1; Fig. 5 is a detail transverse section on the plane of the line 5—5 of Fig. 4.

In the accompanying drawing the negative electrode 1 of my improved storage battery is shown disposed within a vat or containing vessel 2 containing the usual electrolyte preferably formed of sulfuric acid and distilled water. This electrode is shown formed of seven grids spaced apart a sufficient distance to allow the similarly constructed grids of the positive electrode to be placed therebetween, said positive electrode being composed of six grids. Although I have described these electrodes as being constructed of a certain number of grids it is obvious that more may be added if it is desired to form a battery of greater strength than could be obtained from the number stated. Each of these grids 3 are constructed of a plurality of lead tubes 4 of any suitable or preferred diameter and length which are fused, welded or otherwise securely connected by their ends to lead bars 5 and 6, the bars 6 constituting the bottom of the grid while the bars 5 form the top thereof. The tubes 4 are each formed with a plurality of series of openings 7 preferably spaced in longitudinal rows, and placed as close together as possible, leaving only enough space therebetween to furnish sufficient rigidity to the tubes. The holes or openings 7 are of a diameter substantially half the diameter of the tubes so as to allow the electrolyte to act freely on the mass within the tubes; and the openings in one row are arranged in staggered relation to those in the adjacent rows. This disposition of the holes is found to be best inasmuch as it will have a less weakening effect on the tubes, said tubes being comparatively small and the holes rather large. These longitudinal rows of openings 7 are here shown as four in number spaced at diametrically opposite points in the tubes but it is evident that any number of openings may be formed therein and in any suitable design. The active material is adapted to be placed in these tubes 4 and is generally formed in a negative electrode of finely divided sponge lead formed into a paste by the use of any suitable liquid. The opposite ends of the tubes 4 at their junction with the bars 5 and 6 are preferably reduced as shown at 8 in order to better connect them to the narrower bars.

The bars 5 which constitute the tops of the grids 3 have lugs 9 formed at one end which are connected by any suitable method to a connecting plate 10 which extends transversely across the tops of the grids as best shown in Fig. 1, said plate having disposed on its upper surface a threaded stud 11 adapted to receive a thumb nut 12 thereon for the purpose of connecting the electrode with a conductor. This plate 10 not only acts as a connector uniting the several grids but also acts as a support for maintaining said grids in correct position within the vat 2.

This improved storage battery will be considerably stronger and of greater capacity than a battery of similar size employing the usual blanket electrodes because of the fact that more active material can be placed in the grids of this device than can be placed on the usual form of grids. Furthermore the electrolyte in this battery comes in contact with the active material at a plurality of points around the peripheries of the tubes because of the disposition of the holes 7, whereas in the usual plate electrode the electrolyte can act only on the sides thereof.

From the foregoing description taken in connection with the accompanying drawing it is obvious that I have produced a storage battery having electrodes of very simple formation yet of such construction that the storage battery will be of a very large capacity.

While I have described the elements best adapted to perform the functions of the device it is obvious that various changes in form and proportion thereof may be resorted to without departing from the spirit or sacrificing any of the principles of the invention.

I claim:

The combination with a tank, of a plurality of L-shaped bars rectangular in cross section, a flat connecting plate joining the tops of the upright arms of said bars, a binding post on said plate, a plurality of tubes depending from the lower edges of the horizontal arms of said bars, an additional rectangular bar disposed in vertical alinement with each of the horizontal arms of the first mentioned bars and parallel thereto, and connecting the lower ends of said tubes, the opposite ends of the tubes at their junction with the bars being contracted, said last mentioned bars being adapted to rest on the bottom of said tank, each of said tubes having parallel rows of openings spaced equidistant from each other, the diameter of each of the openings being one-half the diameter of the tubes, said openings being spaced in staggered relation, and active material in said tubes.

In testimony whereof I have hereunto set my hand in presence of two subscribing witnesses.

JAMES WILLIAM EAST.

Witnesses:
 IRA KING,
 ROBT. F. RILEY.